(12) United States Patent
Hallstein et al.

(10) Patent No.: US 9,715,115 B2
(45) Date of Patent: Jul. 25, 2017

(54) WAVELENGTH DIVISION MULTIPLEXING OF UNCOOLED LASERS WITH WAVELENGTH-COMMON DISPERSIVE ELEMENT

(71) Applicant: Finisar Corporation, Sunnyvale, CA (US)

(72) Inventors: Sascha Hallstein, Los Gatos, CA (US); Cindy Hsieh, Los Altos, CA (US); Brendan Hamel-Bissell, Stanford, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 14/827,072

(22) Filed: Aug. 14, 2015

(65) Prior Publication Data
US 2016/0047989 A1 Feb. 18, 2016

Related U.S. Application Data (60) Provisional application No. 62/037,268, filed on Aug. 14, 2014, provisional application No. 62/040,265, filed on Aug. 21, 2014.

(51) Int. Cl.
*G02B 27/10* (2006.01)
*G02B 6/293* (2006.01)
*G02B 6/42* (2006.01)

(52) U.S. Cl.
CPC ..... *G02B 27/1013* (2013.01); *G02B 6/29307* (2013.01); *G02B 6/29311* (2013.01); *G02B 6/4214* (2013.01); *G02B 6/4215* (2013.01); *G02B 6/4246* (2013.01); *G02B 6/4286* (2013.01); *G02B 27/1006* (2013.01)

(58) Field of Classification Search
None
See application file for complete search history.

(56) References Cited

U.S. PATENT DOCUMENTS 5,064,263 A * 11/1991 Stein ............... G01J 3/0259
                                              385/130
6,198,864 B1 * 3/2001 Lemoff ............ G02B 6/29367
                                               385/24

(Continued)

*Primary Examiner* — Mike Stahl
(74) *Attorney, Agent, or Firm* — Maschoff Brennan (57) ABSTRACT

An example demultiplexer may include at least one dispersive element that is common to multiple wavelength channels. The demultiplexer may additionally include multiple field lenses positioned optically downstream from the at least one dispersive element, where a number of the field lenses is equal to a number of the wavelength channels. An example multiplexer may include a single piece power monitor assembly that includes a collimator lens array, a focusing lens array, and a slot integrally formed therein. The collimator lens array may be positioned to receive multiple wavelength channels from a laser array. The focusing lens array may be positioned to focus multiple portions of the wavelength channels onto an array of photodetectors. The slot may be configured to tap the portions from the wavelength channels collimated into the single piece power monitor assembly by the collimator lens array and to direct the portions toward the focusing lens array.

20 Claims, 9 Drawing Sheets

(56) References Cited

U.S. PATENT DOCUMENTS

| | | | | |
|---|---|---|---|---|
| 6,269,203 | B1* | 7/2001 | Davies | G02B 6/2938 |
| | | | | 385/24 |
| 6,563,976 | B1* | 5/2003 | Grann | G02B 6/29311 |
| | | | | 385/24 |
| 2001/0026663 | A1* | 10/2001 | Kim | G02B 6/29358 |
| | | | | 385/76 |
| 2002/0131180 | A1* | 9/2002 | Goodman | G02B 6/29367 |
| | | | | 359/634 |
| 2002/0141062 | A1* | 10/2002 | Christoffersen | G02B 5/1852 |
| | | | | 359/566 |
| 2008/0166136 | A1* | 7/2008 | Birincioglu | G02B 6/4206 |
| | | | | 398/212 |
| 2014/0346323 | A1* | 11/2014 | Fujimura | G01J 1/44 |
| | | | | 250/208.2 |
| 2015/0110493 | A1* | 4/2015 | Khor | H04J 14/02 |
| | | | | 398/88 |
| 2015/0180584 | A1* | 6/2015 | Mossberg | G02B 6/29311 |
| | | | | 398/79 |

* cited by examiner

WAVELENGTH DIVISION MULTIPLEXING OF UNCOOLED LASERS WITH WAVELENGTH-COMMON DISPERSIVE ELEMENT

CROSS-REFERENCE TO RELATED APPLICATIONS

This application claims the benefit of and priority to U.S. Provisional Application No. 62/037,268, filed Aug. 14, 2014 and to U.S. Provisional Application No. 62/040,265, filed Aug. 21, 2014. Both of the foregoing provisional applications are incorporated herein by reference.

FIELD

Some embodiments described herein generally relate to wavelength division multiplexing of uncooled lasers with one or more wavelength-common dispersive elements.

BACKGROUND

Unless otherwise indicated herein, the materials described herein are not prior art to the claims in the present application and are not admitted to be prior art by inclusion in this section.

In fiber-optic communication networks, wavelength division multiplexing (WDM) is a technology which multiplexes multiple optical carrier signals onto a single optical fiber by using different wavelengths of laser light for each of the optical carrier signals. The optical carrier signals of different wavelength are sometimes referred to as wavelength (or frequency) channels.

Some WDM systems employ assemblies of cascaded dielectric filters to combine- or multiplex-the individual wavelength channels for transmission over an optical fiber or to separate-or demultiplex-the individual wavelength channels after transmission over an optical fiber. Such a WDM system of n wavelengths requires (n−1) filters each for multiplexing and de-multiplexing. In addition, the cost of each filter increases sharply with the density of the wavelength grid mainly due to yield loss in the manufacturing process.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Example embodiments described herein relate to wavelength division multiplexing of uncooled lasers with one or more wavelength-common dispersive elements.

In an example embodiment, an optical wavelength division demultiplexer includes at least one dispersive element and multiple field lenses. Each of the at least one dispersive element may be common to multiple wavelength channels. The field lenses may be positioned optically downstream from the at least one dispersive element. A number of the field lenses may be equal to a number of the wavelength channels.

In another example embodiment, an optical wavelength division multiplexer, includes a single piece power monitor assembly with a collimator lens array, a focusing lens array, and a slot integrally formed therein. The collimator lens array may be positioned to receive multiple wavelength channels from a laser array. The focusing lens array may be positioned to focus multiple portions of the wavelength channels onto an array of photodetectors. The slot may be configured to tap the portions from the wavelength channels collimated into the single piece power monitor assembly by the collimator lens array and to direct the portions toward the focusing lens array.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Some embodiments described herein generally relate to wavelength division multiplexing of uncooled lasers with one or more wavelength-common dispersive elements.

As already mentioned, some WDM systems employ assemblies of cascaded dielectric filters to combine or separate the individual wavelength channels. Such a WDM system of n wavelengths requires (n−1) filters each for multiplexing and de-multiplexing. In addition, the cost of each filter increases sharply with the density of the wavelength grid mainly due to yield loss in the manufacturing process.

Some embodiments described herein include WDM systems that employ a single dispersive element as opposite to (n−1) dielectric filters. WDM systems that employ a single dispersive element each for multiplexing and de-multiplexing may therefore be highly cost advantageous. Such a WDM system may be cost neutral to channel count and wavelength grid density which may be beneficial for WDM systems with a larger number of wavelengths/channels.

A problem that may be associated with a WDM system with a single dispersive element may arise when wavelength of the wavelength channels is allowed to drift as in the case of uncooled lasers. Unlike in filter-based systems where beam deflection for each channel is constant, WDM systems with a single dispersive element may also separate wavelengths within the same WDM channel. The resulting beam shift may be particularly problematic for a demultiplexer in such WDM systems where wavelength drift can cause channel crosstalk and signal loss.

Some embodiments described herein may mitigate the negative effect of wavelength drift of uncooled laser arrays when demultiplexed using a single dispersive element. Alternatively or additionally, some embodiments described herein may include a power monitor assembly made from a single molded piece that samples laser power without sensitivity to spatial laser mode variations. The embodiments described herein may be implemented in WDM systems such as WDM multiplexers and/or demultiplexers that may have reduced insertion loss (especially for larger channel counts), better scalability to relatively large 1D and/or 2D arrays, and/or a higher level of integration as compared to WDM systems that employ assemblies of cascaded dielectric filters to combine or separate individual wavelength channels.

The embodiments described herein can be implemented in various optoelectronic modules and optoelectronic systems. As used herein, the term "optoelectronic module" and "optoelectronic system" includes modules and systems having both optical and electrical components. Examples of optoelectronic modules include, but are not limited to, active electrical cables, active optical cables, transponders, transceivers, transmitters, and/or receivers. Optoelectronic modules can be used, for instance, in telecommunications networks, local area networks, metro area networks, storage area networks, wide area networks, and the like and can be configured to conform with one or more standardized form factors or multi-source agreements ("MSAs"), including the QSFP, CXP, CFP, XFP and SFP+ form factors, without restriction. It will be appreciated, however, that the electronic and optoelectronic modules need not comply with standardized form factor requirements and may have any size or configuration necessary according to a particular design.

The optoelectronic modules according to some embodiments can be configured for electrical and/or optical signal transmission and reception at a variety of per-second data rates including, but not limited to, 10 Gigabits per second ("G"), 40 G, 100 G, or higher. As used herein, the terms "10 G", "40 G", "100 G", and similar terms represent rounded approximations of common signaling rates and have the meanings commonly understood by those of skill in the art.

Furthermore, the optoelectronic modules according to some embodiments can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the optoelectronic modules can be configured to support various transmission standards including, but not limited to, Ethernet, Fibre Channel, Infiniband and SONET/SDH.

Reference will now be made to the drawings wherein like structures will be provided with like reference designations. It should be understood that the drawings are diagrammatic and schematic representations of exemplary embodiments and, accordingly, are not limiting of the scope of the present invention, nor are the drawings necessarily drawn to scale.

Figure 1A:
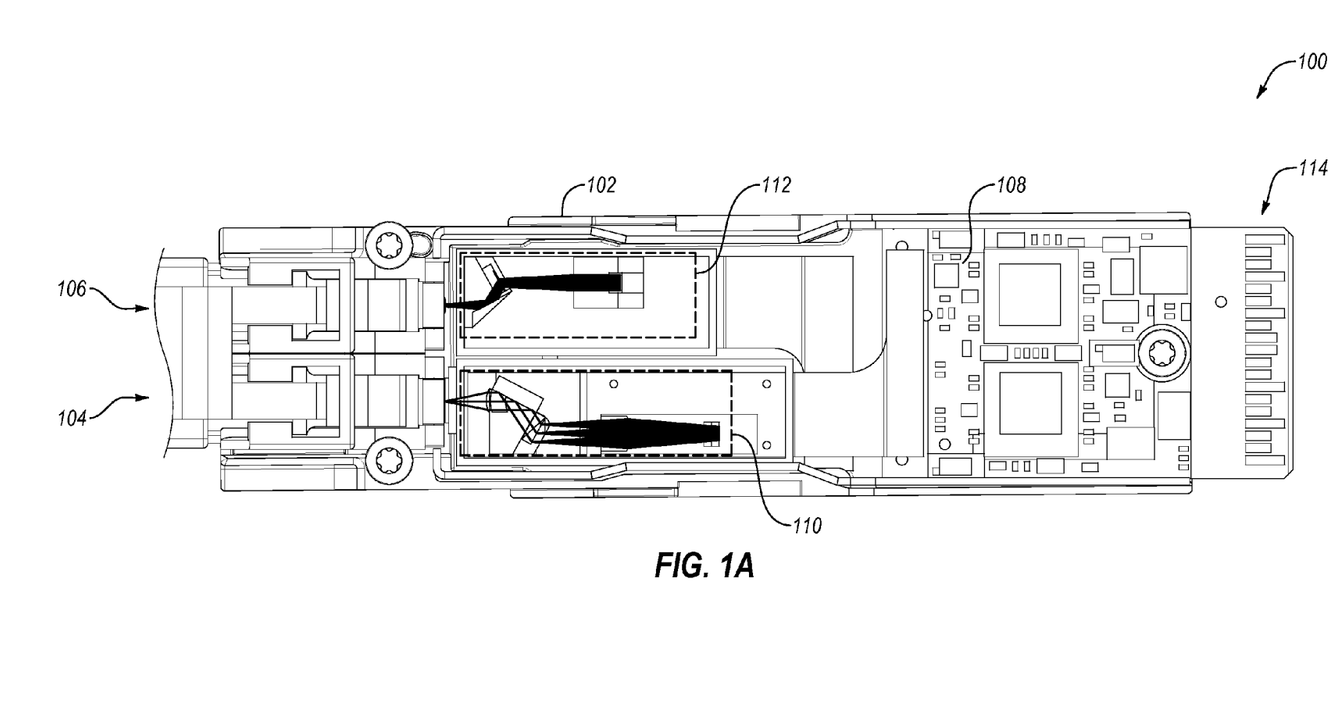
FIGS. 1A and 1B depict an example optoelectronic module to transmit and receive optical signals.
Figure 1B:
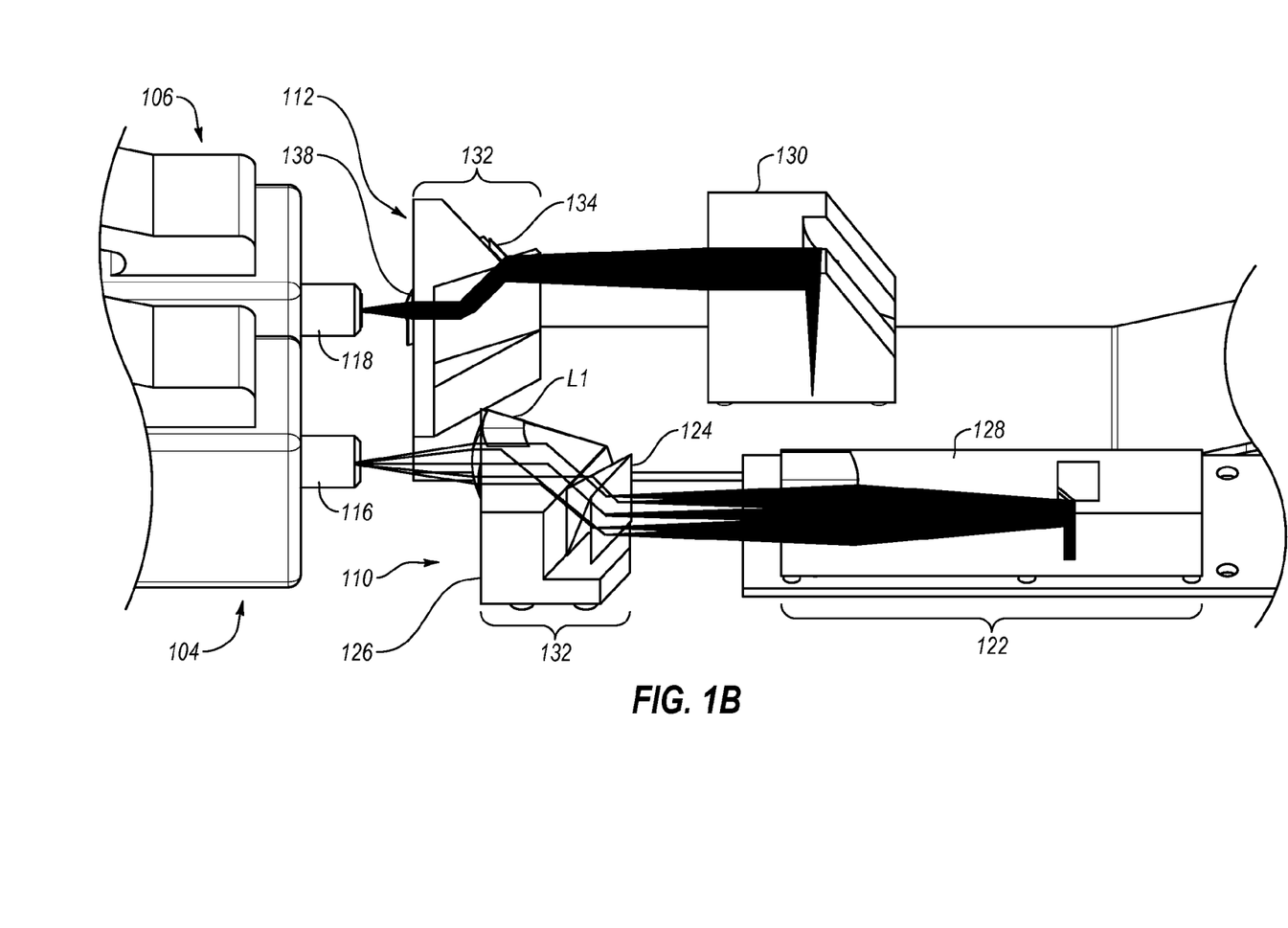

Reference is first made to FIGS. 1A-1B which depict an example optoelectronic module 100 ("module 100") to transmit and receive optical signals in connection with a host device (not shown) that is operatively connected in some embodiments to a communication network (not shown). FIGS. 1A-1B illustrate, respectively, an overhead view of the module 100 and a detailed perspective view of a portion of the module 100.

The module 100 is one environment in which example embodiments can be practiced. As disclosed in FIG. 1A, the module 100 includes various components, including a bottom housing 102 configured to mate with a top housing (not shown), a receive port 104 and a transmit port 106 defined in the bottom housing 102, a printed circuit board (PCB) 108 positioned within a cavity defined by the bottom housing 102 and the top housing, a receive assembly 110 generally denoted by a first dashed outline, and a transmit assembly 112 generally denoted by a second dashed outline. The receive assembly 110 and the transmit assembly 112 are both electrically coupled to the PCB 108 and are in optical communication with, respectively, the receive port 104 and the transmit port 106. An edge connector 114 is located on an end of the PCB 108 to enable the module 100 to electrically interface with a host device (not shown). As such, the PCB 108 facilitates electrical communication between the receive assembly 110/transmit assembly 112 and the host device.

Referring to FIG. 1B, an optical fiber received within the receive port 104 may include a fiber end 116 in optical communication with the receive assembly 110. Analogously, an optical fiber received within the transmit port 106 may include a fiber end 118 in optical communication with the transit assembly 112.

The receive assembly 110 may generally include a demultiplexer (hereinafter "demux") and an array of photodetectors (not shown), such as positive-intrinsic-negative (PIN) photodiodes, avalanche photodiodes (APDs), or other suitable photodetectors. The demux may include first and second RX assemblies 120 and 122 (collectively "demux 120/122").

The first RX assembly 120 may include a first lens L1, a dispersive element 124, and a beam redirector 126. The first lens L1 may be integrally formed with the beam redirector 126 (e.g., from the same materials and as a unitary component therewith) or may be formed as a separate component that is coupled to the beam redirector 126.

The dispersive element 124 may include a diffraction grating, such as a fused silica grating, a prism, or other suitable dispersive element. In an example embodiment in which the dispersive element 124 includes a diffraction grating, the dispersive element 124 may have a line density of only 1336 lines per millimeter (mm) to minimize or at least reduce non-uniformity of channel pitch compared to diffraction gratings with other line densities. Minimizing or at least reducing non-uniformity of channel pitch may enable the use of constant pitch detector arrays. More generally, the dispersive element 124 implemented as a diffraction grating may have a line density in a range from 500 lines per mm to 3000 lines per mm. Higher dispersion elements (e.g., dispersive elements with line densities of about 1800 lines per mm or higher) lead to designs of shorter length at the expense of pitch non-uniformities in excess of 10%. Such designs may require custom, non-equidistant detector arrays to avoid WDM channel crosstalk.

The beam redirector 126 may include a molded thermoplastic block. In an example embodiment, the beam redirector 126 includes amorphous thermoplastic polyetherimide (PEI) resin, sometimes marketed under the trade name ULTEM. Other optical grade plastics such as acrylic, polycarbonate, polystyrene, cyclic olefin copolymer, and cyclic olefin polymer may be suitable materials for the beam redirector 126 as well.

The second RX assembly 122 may include a housing 128, a second lens L2 (not shown in FIG. 1B) positioned within the housing 128, and a third lens L3 (not shown) positioned within the housing 128. The third lens L3 may include a field lens array. One or both of the second lens L2 and the third lens L3 may be made from one or more of the materials and/or processes described with respect to the beam redirector 126 above. The arrangement and operation of the demux 120/122 will be described in greater detail with respect to FIGS. 2A-2E.

The transmit assembly 112 may generally include a multiplexer (hereinafter "mux"), an array of lasers (not shown), and an array of monitor photodetectors (MPDs). The array of lasers may include an array of vertical-cavity surface-emitting lasers (VCSELs), such as a 4×1 array of uncooled VCSELs. Alternately or additionally, the array of MPDs may include an array of PIN photodiodes. The mux may include a power monitor assembly 130 and a TX assembly 132 (collectively "mux 130/132").

The power monitor assembly 130 may be made from one or more of the materials and/or processes described with respect to the beam redirector 126 above. In an example embodiment, the power monitor assembly 130 includes amorphous thermoplastic PEI resin. Two example embodiments of the power monitor assembly 130 are described in greater detail with respect to FIGS. 3A-4C.

The TX assembly 132 may include a dispersive element 134, a beam redirector 136, and a coupler lens 138. The dispersive element 134 may include a diffraction grating, such as a fused silica grating, a prism, or other suitable dispersive element. In an example embodiment in which the dispersive element 134 includes a diffraction grating, the dispersive element 134 has a line density of 1700 lines per mm. More generally, the dispersive element 134 implemented as a diffraction grating may have a line density in a range from 500 lines per mm to 3000 lines per mm. The beam redirector 136 may be made from one or more of the materials and/or processes described with respect to the beam redirector 126 above. The arrangement and operation of the mux 130/132 according to two example embodiments will be described in greater detail with respect to FIGS. 3A-4C.

For convenience in the discussion that follows, the dispersive elements 124 and 134 may be discussed as each including a diffractive element such that light may be diffracted thereby. In other embodiments in which the dispersive elements 124 and 134 are implemented as prisms, light may instead be refracted thereby.

Figure 2A:
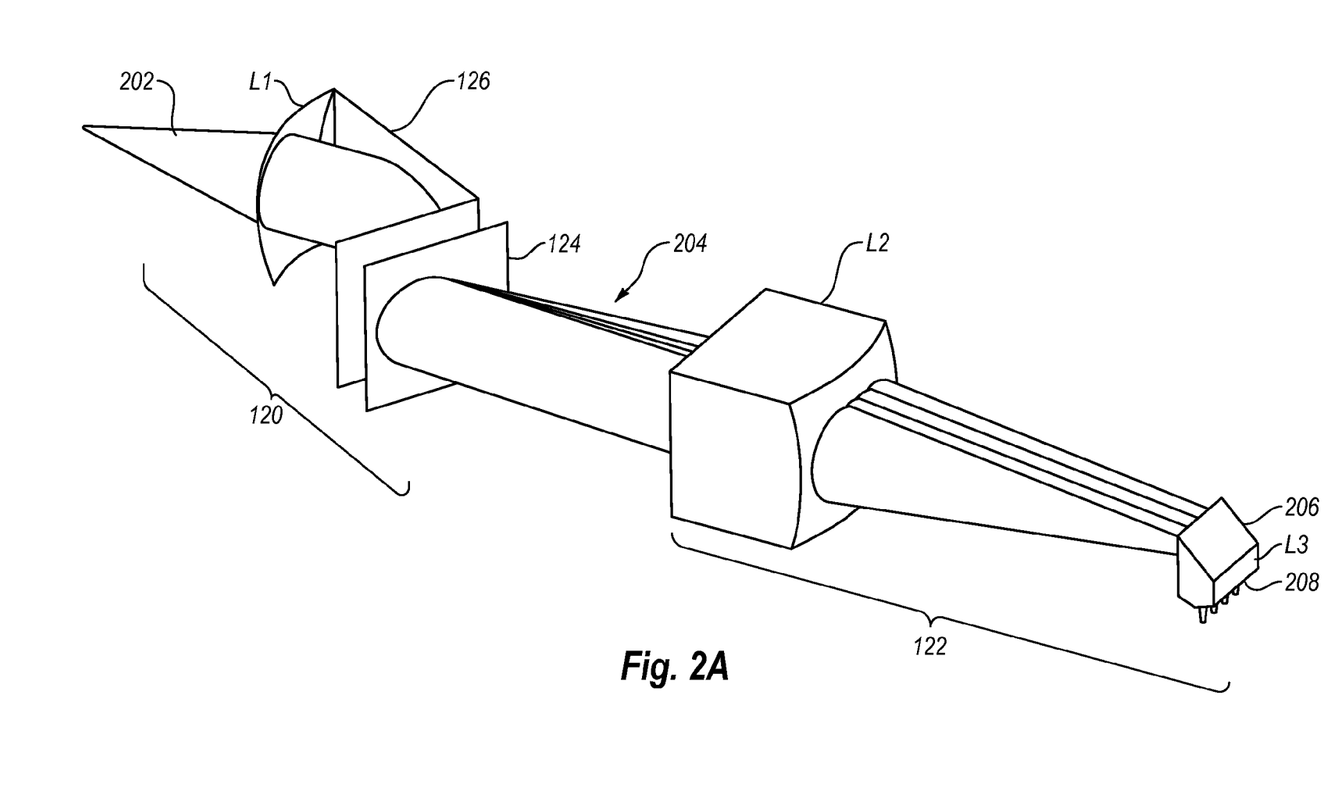
FIGS. 2A and 2B respectively include a perspective view and an overhead view of a model of a demux that may be included in the optoelectronic module of FIGS. 1A and 1B.
Figure 2B:
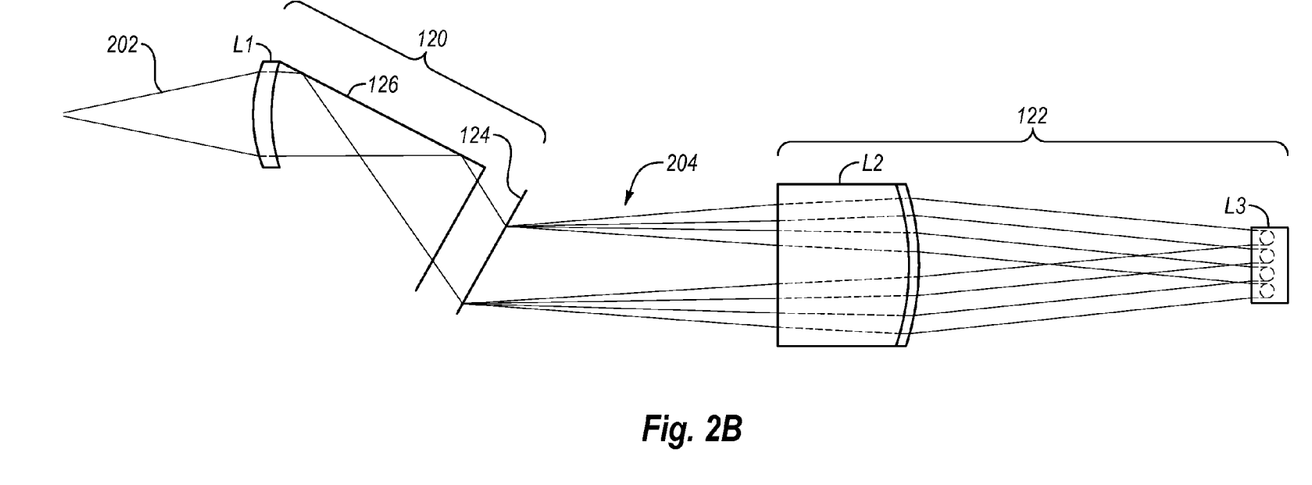

FIGS. 2A-2B include a perspective view and an overhead view of a model of the demux 120/122, arranged in accordance with at least one embodiment described herein. FIGS. 2A and 2B additionally illustrate a beam path through the demux 120/122.

In operation, an incoming light beam 202 is received from an end of an optical fiber, e.g., the fiber end 116 of FIG. 1B, by the first lens L1. The light beam 202 includes multiple different wavelength channels. The light beam 202 is collimated by the first lens L1 and enters the beam redirector 126 where total internal reflection (TIR) creates the proper incidence angle onto the dispersive element 124. The dispersive element 124 causes an angular separation of the different wavelength channels which propagate as collimated bundles 204 towards the second lens L2. A distance between the dispersive element 124 and the second lens L2 may be equal or substantially equal to a focal length f2 of the second lens L2 such that beam propagation of the collimated bundles 204 is telecentric, e.g., the collimated bundles 204 propagate along an optical axis of the second lens L2.

The third lens L3 may include an angled surface 206 (FIG. 2A) and a field lens array 208 (FIG. 2A). Each field lens of the field lens array 208 may be formed in, on, at, and/or near a bottom surface of the third lens L3. Alternately or additionally, the field lenses in the field lens array 208 may be arranged in a pattern and/or with a pitch that is equal or substantially equal to a pattern and pitch of photodetectors in the array of photodetetors.

In operation, the third lens L3 (more particularly, the angled surface 206) imparts a turn, such as a 90 degree turn, by TIR to each of the wavelength channels received from the second lens L2 to redirect the wavelength channels to the field lens array 208. Each field lens in the field lens array 208 is assigned to a different one of the wavelength channels. The wavelength channels may be focused onto the principal plane (convex surface) of each field lens of the field lens array 208 to maximize wavelength and fiber placement tolerance, e.g., beam shift, for each wavelength channel. The wavelength channels then continue to diverge towards the array of photodetectors, but each wavelength channel is directed and/or deflected by the corresponding field lens of the field lens array 208 towards a center of the corresponding photodetector independent of the beam shift. The working distance (WD) is equal in some embodiments to a focal length f3 of the field lenses of the field lens array 208.

A feature of the embodiment illustrated in FIGS. 2A-2B is that a source (fiber) of the incoming light beam 202 may not be imaged onto the photodetector of the array of photodetectors. The combination of the second and third lenses L2 and L3 may instead cause a de-magnified image of the beam spot on the dispersive element 124 (aperture stop), which may ensure collection of all wavelength channels as long as the diameter of lens L2 is sufficiently large.

Figure 2C:
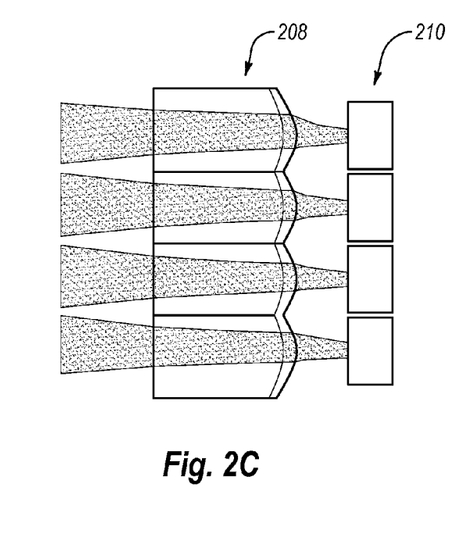
FIGS. 2C-2E illustrate a model of an example of a field lens array that may be included in the model of the demux included in the optoelectronic module of FIGS. 1A and 1B.
Figure 2D:
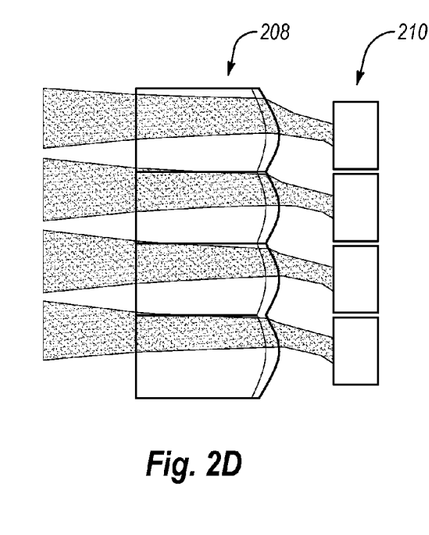
Figure 2E:
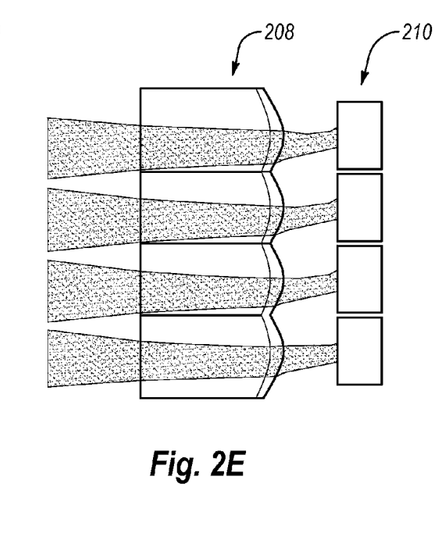

FIGS. 2C-2E illustrate a model of an example of the field lens array 208 of FIGS. 2A-2B, arranged in accordance with at least one embodiment described herein. FIGS. 2C-2E additionally illustrate an example array 210 of photodetectors that includes four photodetectors that may correspond to or include the array of photodetectors discussed previously.

Each of the wavelength channels may be nominally centered on a corresponding target wavelength. The target wavelengths may include wavelengths defined in a grid, such as the ITU Grid, or other suitable grid. When the wavelength channels are centered on corresponding target wavelengths, each of the field lenses of the field lens array 208 may direct a corresponding one of the wavelength channels to a center of a corresponding one of photodetectors in the array 210, as illustrated in FIG. 2C. In FIG. 2C, the wavelength channels from top to bottom are centered on, respectively 940 nanometers (nm), 910 nm, 880 nm, and 850 nm.

In applications that include uncooled lasers, the laser wavelengths may drift high or low compared to the target wavelengths of the wavelength grid depending on, e.g., operating temperature and the environment temperature of the lasers. More particularly, the actual wavelength of each channel may drift higher or lower than the assigned grid wavelength. In turn, the wavelength deviation from the change in center grid wavelength of each channel results, in among other things, a change in the diffraction angle of each wavelength channel by the dispersive element 124 and a change to a location at which each wavelength channel intersects the corresponding field lens of the field lens array 208 compared to when the actual wavelengths of the wavelength channels are at the target/grid wavelengths.

For instance, in an example implementation, when the channel wavelengths are shifted about +6.3 nm compared to their target/grid wavelengths, the locations at which each wavelength channel intersects the corresponding field lens of the field lens array 208 may be shifted higher as seen by comparing FIG. 2D to FIG. 2C. Alternately or additionally, when the channel wavelengths are shifted about −6.3 nm compared to the target/grid wavelengths, the locations at which each wavelength channel intersects the corresponding field lens of the field lens array 208 may be shifted lower as seen by comparing FIG. 2E to FIG. 2C. More generally, the locations at which each wavelength channel intersects the corresponding field lens of the field lens array 208 may be increasingly shifted upward compared to FIG. 2C with increasing positive wavelength shift from the target wavelengths. Analogously, the locations at which each wavelength channel intersects the corresponding field lens of the field lens array 208 may be increasingly shifted downward compared to FIG. 2C with increasing negative wavelength shift from the target wavelengths.

Although the locations at which each wavelength channel intersects the corresponding field lens of the field lens array 208 may be shifted from center as a result of wavelength drift, the field lenses of the field lens array 208 may nevertheless deflect or bend each of the wavelength channels towards a center of the corresponding photodetector. For instance, in FIGS. 2D and 2E, the field lenses of the field lens array 208 deflect or bend the wavelength channels downward or upward, respectively, toward centers of the photodetectors in the array 210.

Figure 3A:
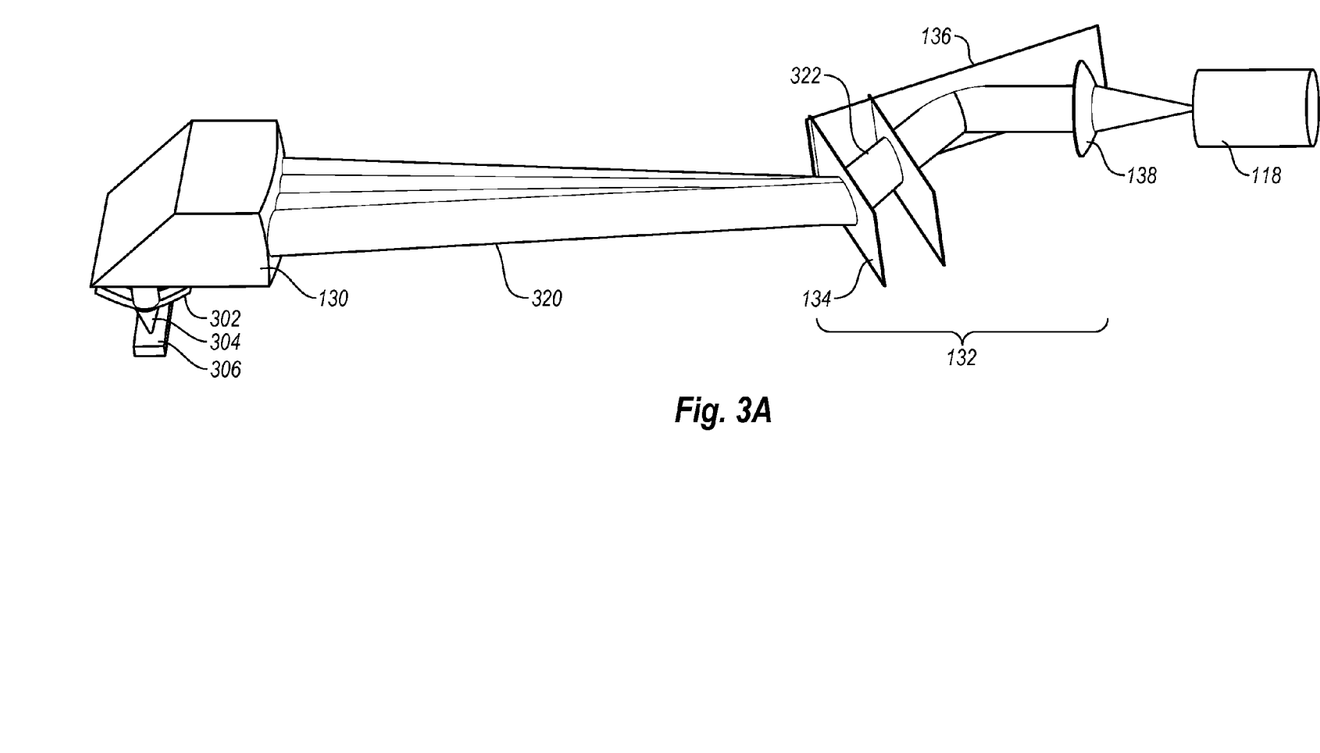
FIGS. 3A and 3B include a perspective view and an overhead view of a model of a mux that may be included in the optoelectronic module of FIGS. 1A and 1B.
Figure 3B:
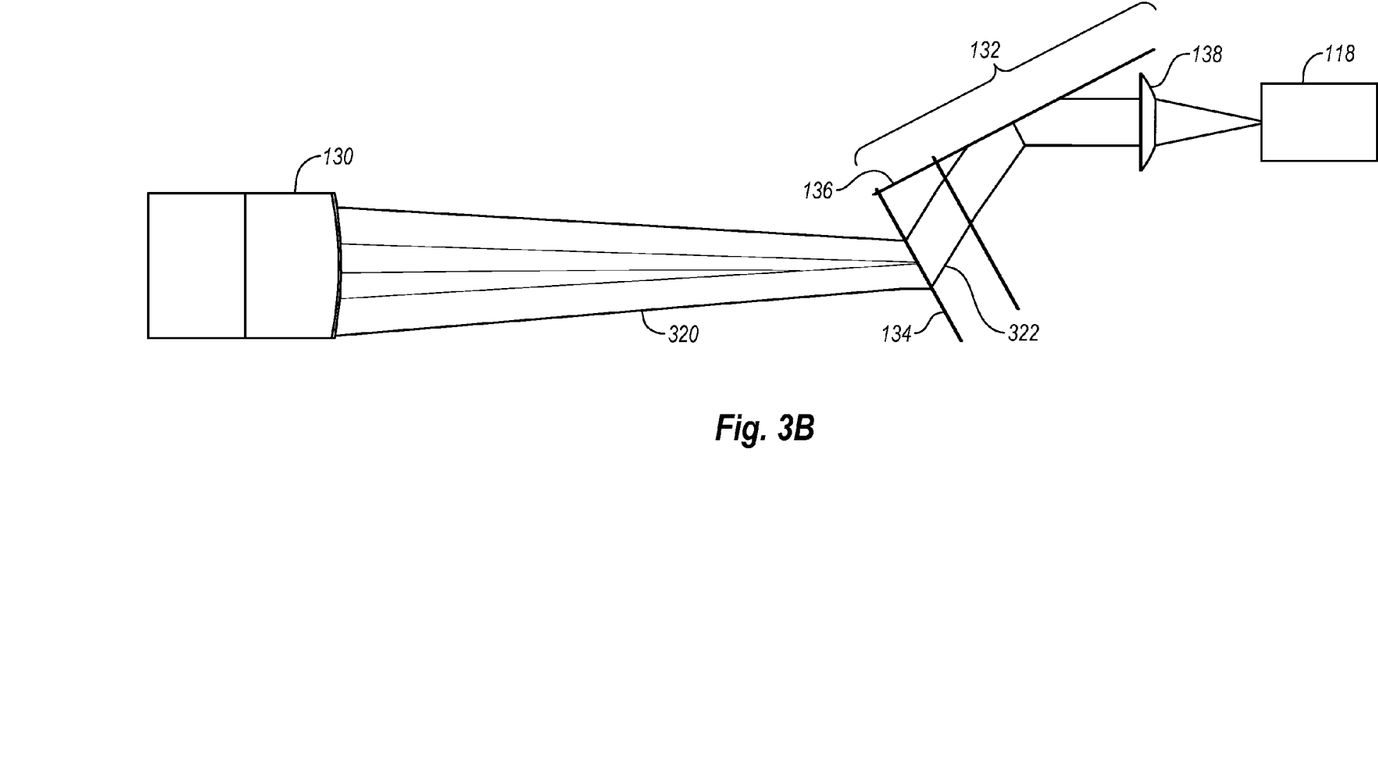

FIGS. 3A-3B include a perspective view and an overhead view of a model of the mux 130/132, arranged in accordance with at least one embodiment described herein. FIGS. 3A and 3B additionally illustrate a beam path through the mux 130/132 to the fiber end 118 of FIG. 1B.

As illustrated in FIG. 3A, the power monitor assembly 130 may include at least an array 302 of collimator lenses (hereinafter "collimator lens array 302") that collimate wavelength channels 304 emitted by an array 306 of lasers (hereinafter "laser array 306"). The laser array 306 may include an array of VCSELs or other suitable lasers. In an example implementation, the laser array 306 includes a 4×1 array of uncooled VCSELs. The laser array 306 may be included in the transmit assembly 112 of FIGS. 1A and 1B.

Figure 3C:
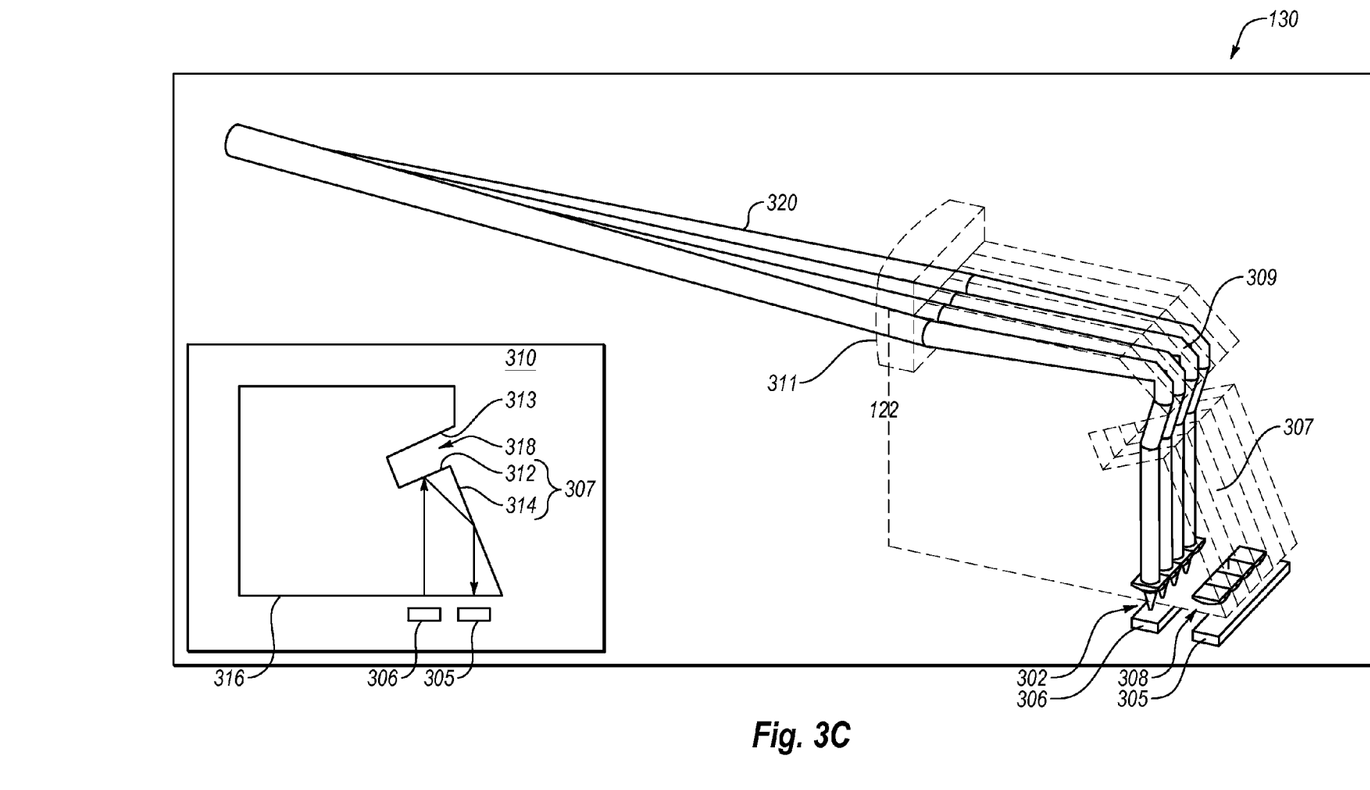
FIGS. 3C and 3D include perspective views of models of a power monitor assembly that may be included in the model of the mux of FIGS. 3A-3B, all arranged in accordance with at least one embodiment described herein.
Figure 3D:
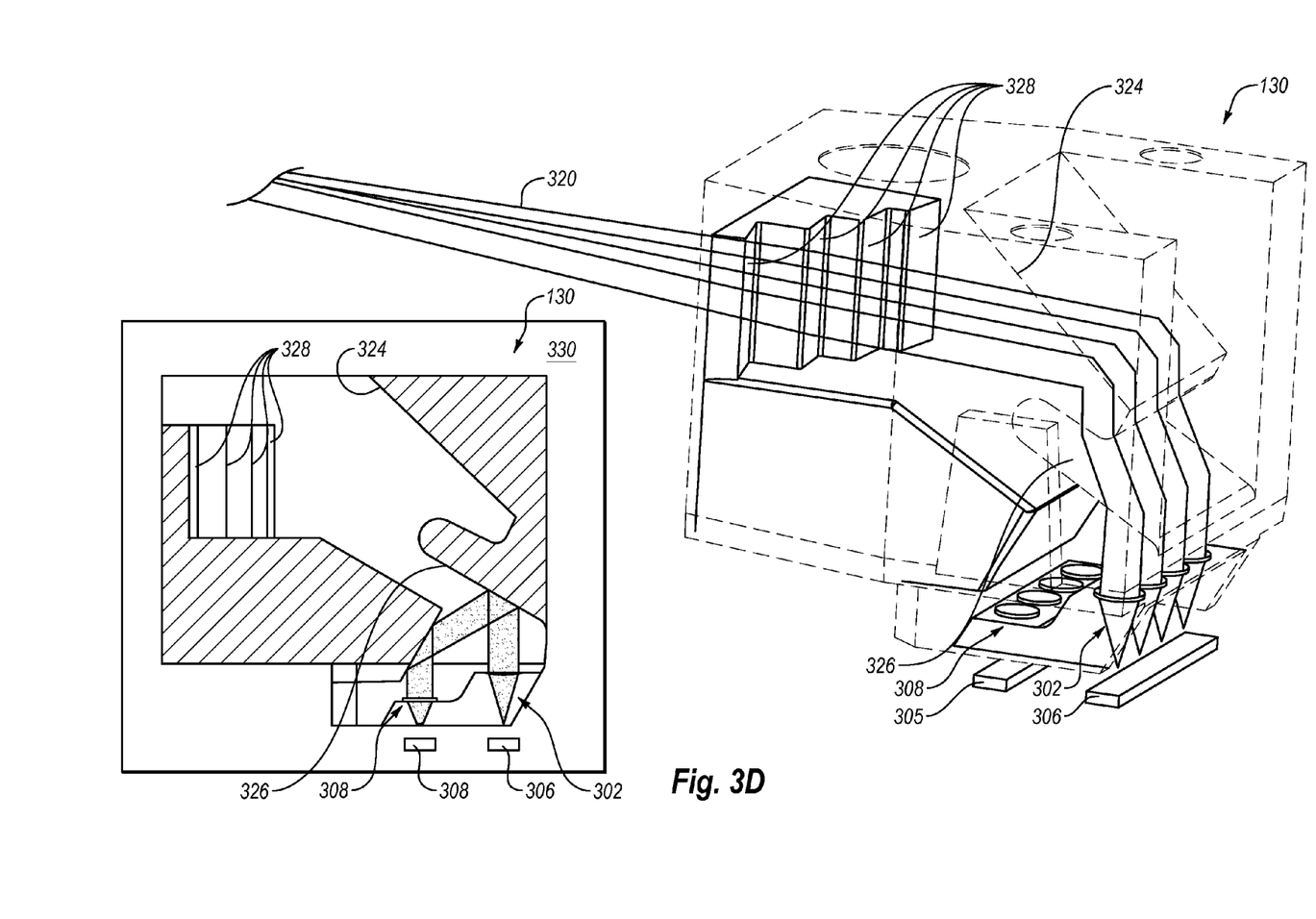

FIGS. 3C and 3D include perspective views of models of the power monitor assembly 130, arranged in accordance with at least one embodiment described herein. In the examples of FIGS. 3C and 3D, the power monitor assembly 130 may include the collimator lens array 302 and an array 308 of focusing lenses (hereinafter "focusing lens array 308"). In the example of FIG. 3C, the power monitor assembly 130 may additionally include a roof prism 307, an array of tilted, negative, off-axis parabolas 309 (hereinafter "parabola array 309"), and a collimator lens 311. In the example of FIG. 3D, the power monitor assembly 130 may additionally include a mirror 324, a tap mirror 326, an angled facets 328.

In general, the collimator lens array 302 may collimate wavelength channels 304 emitted by the laser array 306 into the power monitor assembly 130 and the focusing lens array 308 may focus a tapped portion of each of the wavelength channels 304 onto a monitor photodiode array (MPD array) 305 positioned beneath the focusing lens array 308. More particularly, each collimator lens of the collimator lens array 302 may collimate a corresponding one of the wavelength channels 304 (FIG. 3A) into the power monitor assembly 130. Additionally, each focusing lens of the focusing lens array 308 may focus a tapped portion of a corresponding one of the wavelength channels 304 onto a corresponding MPD of the MPD array 305.

FIG. 3C additionally includes a simplified side view of the power monitor assembly 130, generally denoted at 310 (hereinafter "side view 310"). With reference to the side view 310, two surfaces of the power monitor assembly 130 that form a "roof" portion of the roof prism 307 may include a first surface 312 and a second surface 314. In an example implementation, an angle of the first surface 312 relative to horizontal or to a bottom surface 316 of the power monitor assembly 130 may be about 22.5 degrees. The power monitor assembly 130 defines a slot 318 bounded on three sides by surfaces of the power monitor assembly 130 that include the first surface 312 and two other surfaces depicted in the side view 310, including a third surface 313 that is opposite the first surface 312.

In the example of FIG. 3C, the collimator lens array 302 collimates the wavelength channels 304 into the power monitor assembly 130. A portion of each of the wavelength channels 304 is tapped by the first surface 312 and the second surface 314. In particular, the first surface 312 reflects a portion of each of the wavelength channels 304 toward the second surface 314. The second surface 314 redirects, e.g., reflects, the portions received from the first surface 312 to the focusing lens array 308. Each focusing lens of the focusing lens array 308 focuses a corresponding one of the portions onto a corresponding MPD of the MPD array 305 for power monitoring. Each MPD of the MPD array 305 may generate an electrical signal that indicates a power of the portion of the corresponding one of the wavelength channels 304 incident thereon. Provided a reflectance of the first surface 312 is known, the power of each of the wavelength channels 304 may be determined from the power of the corresponding portion detected by the corresponding MPD of the MPD array 305. The reflectance of the first surface 312 is determined by the incidence angle and may be suitably chosen to be about 5-10% in some implementations, at least with respect to the wavelengths of the wavelength channels 304.

With continued reference to the example of FIG. 3C, a majority of each of the wavelength channels 304 may propagate through the slot 318 to the parabola array 309. For instance, the slot 318, and more particularly, the first surface 312 and the third surface 313 in aggregate may have a transmittance of about 80-90% in some implementations, at least with respect to the wavelengths of the wavelength channels 304. The first surface 312 and the third surface 313 may be non-parallel in some implementations to create draft for a molding insert.

With continued reference to FIG. 3C, the parabola array 309 may redirect the wavelength channels 304 toward the collimator lens 311. For example, each parabola of the parabola array 309 may turn a corresponding one of the wavelength channels by 90 degrees (or other suitable angle) and may create a corresponding divergent wavelength channel (e.g., a corresponding redirected wavelength channel) which emanates from a corresponding virtual point source generally to the right in FIG. 3C of the corresponding parabola. A focal length of each of the parabolas of the parabola array 309 may be selected such that a corresponding virtual focal point is at a focal length of the collimator lens 311. As a result, the mux 130/132 may have a telecentric layout with converging collimated wavelength channels 320 arriving at a common location or substantially common location on the dispersive element 134.

FIG. 3D is an alternate configuration which eliminates the parabolas of the parabola array 309 and instead includes the mirror 324, which may be a flat TIR turning mirror (e.g., the beam is turned 90 degrees upon reflection). In FIG. 3D, the collimator lens 311 of FIG. 3C is replaced with the angled facets 328, which may be arranged in an array of planar angled facets. Facet angles and facet positions along the optical axis may be chosen such that the light of the different wavelength channels has suitable incidence angles and in addition is directed to a common location on the dispersive element 134. The tap mirror 326 of FIG. 3D may be angled relative to horizontal at 22.5 degrees or other suitable angle. The tap mirror 326 may have a reflectance of 5-10% at least with respect to the wavelength channels 304 and may redirect a portion of each of the wavelength channels 304 through the focusing lens array 308 to the MPD array 305. The tap mirror 326 may have a transmittance of 90-95% at least with respect to the wavelength channels 304 such that about 90-95% of each of the wavelength channels 304 is transmitted through the tap mirror 326. In FIG. 3D, a side view 330 is provided of the power monitor assembly 130 of FIG. 3D Whether the mux 130/132 implements the power monitor assembly 130 of FIG. 3C or the power monitor assembly 130 of FIG. 3D, the dispersive element 134 receives and combines the converging collimated wavelength channels 320. An angular separation of the converging collimated wavelength channels 320 at the dispersive element 134 and the different wavelengths of each channel results in a different angle of diffraction by the dispersive element 134 of each of the converging collimated wavelength channels 320. In a combined output 322 of the dispersive element 134, each of the wavelength channels propagates in a common direction (e.g., common angle relative to the dispersive element 134) to the beam redirector 136. TIR within the beam redirector 136 redirects the combined output 322 to the coupler lens 138. The coupler lens 138 couples the combined output 322 redirected by the beam redirector 136 into the fiber end 118.

The coupler lens 138 may include features for selective fiber mode launch and laser isolation, such as a phase plate. Alternately or additionally, any other optical surface in the mux 130/132 may include the features for selective mode launch or laser isolation. The excitation of selective mode groups improves the fiber transmission bandwidth under suitable conditions. A suitable phase plate may also reduce laser feedback from fiber facet reflections.

Embodiments described herein may be implemented in short wavelength WDM optoelectronic modules. In some implementations, such optoelectronic modules may conform to the QSFP MSA and may each include a 4×1 array of VCSELs. Each VCSEL of such an optoelectronic module may be modulated to emit an optical data signal with a bit rate of 25 G for an aggregate bit rate of 100 G across all four VCSELs of the optoelectronic module.

The demux 120/122 is an example of an optical wavelength division demultiplexer. Consistent with and according to the principals described herein, some implementations of an optical wavelength division demultiplexer may use one or more dispersive elements which are common for all wavelength channels and multiple field lenses. Alternately or additionally, some implementations of an optical wavelength division demultiplexer may include one or more dispersive elements which are common for all wavelength channels and multiple field lenses, where at least some components of the optical wavelength division demultiplexer are made by molding. Alternately or additionally, some implementations of an optical wavelength division multiplexer may include a single dispersive element which is common for all wavelength channels and multiple field lenses.

The mux 130/132 is an example of an optical wavelength division multiplexer. Consistent with and according to the principals described herein, some implementations of an optical wavelength division multiplexer may include a single piece power monitor assembly that includes integrally formed therein a collimator lens array, a focusing lens array, and a slot for beam splitting. Alternately or additionally, some implementations of an optical wavelength division multiplexer may include a single dispersive element which is common to all wavelength channels and a single piece power monitor assembly that includes integrally formed therein a collimator lens array, a focusing lens array, and a slot for beam splitting. Alternately or additionally, some implementations of an optical wavelength division multiplexer may include a single piece power monitor assembly that includes integrally formed therein a collimator lens array, a focusing lens array, a slot for beam splitting, an array of negative off-axis parabolas, and a common collimator lens that is common to all wavelength channels. Alternately or additionally, some implementations of an optical wavelength division multiplexer may include a single dispersive element which is common to all wavelength channels, a single piece power monitor assembly that includes integrally formed therein a collimator lens array, a focusing lens array, a slot for beam splitting, an array of negative off-axis parabolas, and a common collimator lens.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical wavelength division demultiplexer, comprising:
    at least one dispersive element, wherein each of the at least one dispersive element is common to a plurality of wavelength channels;
    a plurality of field lenses positioned optically downstream from the at least one dispersive element, a number of the plurality of field lenses being equal to a number of the plurality of wavelength channels;
    a first lens positioned to receive an input beam comprising the plurality of wavelength channels from an optical fiber, the first lens configured to collimate the input beam;
    a beam redirector positioned to receive the collimated input beam from the first lens and to redirect the collimated input beam toward the at least one dispersive element, wherein the at least one dispersive element is configured to impart an angular separation to the plurality of wavelength channels included in the collimated input beam dependent on wavelength;
    a second lens positioned to receive an output of the at least one dispersive element and configured to focus the output of the at least one dispersive element; and
    a third lens positioned to receive an output of the second lens, the output of the second lens comprising the plurality of wavelength channels propagating in parallel and laterally displaced from each other, wherein the third lens comprises an angled surface and the plurality of field lenses, the angled surface configured to redirect the plurality of wavelength channels to the plurality of field lenses for output to a plurality of photodetectors.

2. The optical wavelength division demultiplexer of claim 1, wherein at least one component of the optical wavelength division demultiplexer comprises a molded thermoplastic component.

3. The optical wavelength division demultiplexer of claim 2, wherein the molded thermoplastic component comprises amorphous thermoplastic polyetherimide resin.

4. The optical wavelength division demultiplexer of claim 1, wherein the at least one dispersive element comprises a single dispersive element by which all of the plurality of wavelength channels are angularly separated through diffraction.

5. The optical wavelength division demultiplexer of claim 1, wherein the at least one dispersive element comprises a single prism by which all of the plurality of wavelength channels are angularly separated through refraction.

6. The optical wavelength division demultiplexer of claim 1, wherein the optical wavelength division demultiplexer lacks any dielectric filters or other filters to separate the plurality of wavelength channels from each other.

7. The optical wavelength division demultiplexer of claim 1, wherein the at least one dispersive element comprises at least one of a prism, a diffraction grating, a fused silica grating, or a grating with a line density of 1336 lines per millimeter.

8. The optical wavelength division demultiplexer of claim 1, wherein a distance between the at least one dispersive element and the second lens is equal or substantially equal to the focal length f2 of the second lens.

9. The optical wavelength division demultiplexer of claim 1, wherein each of the plurality of field lenses is configured to direct and/or deflect a corresponding one of the plurality of wavelength channels into a center of a corresponding one of the plurality of photodetectors responsive to the corresponding one of the plurality of wavelength channels being focused on any location of a principal plane of the corresponding one of the plurality of field lenses.

10. The optical wavelength division demultiplexer of claim 1, wherein the at least one dispersive element, the plurality of field lenses and one or more lenses or one or more mirrors that are part of the wavelength division demultiplexer are collectively formed in a single molded thermoplastic component.

11. An optoelectronic module, comprising:
    a housing;
    a transmit assembly that includes a multiplexer and a laser array, wherein the transmit assembly is disposed in the housing; and
    a receive assembly that includes a demultiplexer and an array of photodetectors, wherein the receive assembly is disposed in the housing, the demultiplexer comprising:
        at least one dispersive element, wherein each of the at least one dispersive element is common to a plurality of wavelength channels;
        a plurality of field lenses positioned optically downstream from the at least one dispersive element and configured to direct and/or deflect a corresponding one of the plurality of wavelength channels to a corresponding photodetector of the array of photodetectors, a number of the plurality of field lenses being equal to a number of the plurality of wavelength channels;
        a first lens positioned to receive an input beam comprising the plurality of wavelength channels from an optical fiber, the first lens configured to collimate the input beam;
        a beam redirector positioned to receive the collimated input beam from the first lens and to redirect the collimated input beam toward the at least one dispersive element, wherein the at least one dispersive element is configured to impart an angular separation to the plurality of wavelength channels included in the collimated input beam dependent on wavelength;
        a second lens positioned to receive an output of the at least one dispersive element and configured to focus the output of the at least one dispersive element; and
        a third lens positioned to receive an output of the second lens, the output of the second lens comprising the plurality of wavelength channels propagating in parallel and laterally displaced from each other, wherein the third lens comprises an angled surface and the plurality of field lenses, the angled surface configured to redirect the plurality of wavelength channels to the plurality of field lenses for output to a plurality of photodetectors.

12. The optoelectronic module of claim 11, wherein the plurality of wavelength channels comprises a first plurality of wavelength channels, the array of photodetectors comprises a first array of photodetectors, and the multiplexer comprises:
    a single piece power monitor assembly that includes integrally formed therein:
        a collimator lens array positioned to receive a second plurality of wavelength channels from the laser array;
        a focusing lens array positioned to focus a plurality of portions of the second plurality of wavelength channels onto a second array of photodetectors; and a slot configured to tap the plurality of portions from the second plurality of wavelength channels collimated into the single piece power monitor assembly by the collimator lens array and to direct the plurality of portions toward the focusing lens array.

13. The optoelectronic module of claim 12, wherein the at least one dispersive element comprises at least one first dispersive element, the optoelectronic module further comprising at least one second dispersive element positioned to combine the second plurality of wavelength channels from the power monitor assembly through either refraction or diffraction, wherein each of the at least one second dispersive element is common to at least two of the second plurality of wavelength channels.

14. The optoelectronic module of claim 12, wherein the power monitor assembly further comprises integrally formed therein:
- an array of negative off-axis parabolas positioned to receive the second plurality of wavelength channels after transmission through the slot; and
- a common collimator lens positioned to collimate the second plurality of wavelength channels after being defocused by the array of negative off-axis parabolas.

15. The optoelectronic module of claim 12, wherein at least one component of the multiplexer comprises a molded thermoplastic component.

16. The optoelectronic module of claim 15, wherein the molded thermoplastic component comprises amorphous thermoplastic polyetherimide resin.

17. The optoelectronic module of claim 12, wherein the multiplexer lacks any dielectric filters or other filters to combine the second plurality of wavelength channels into a combined output beam.

18. The optoelectronic module of claim 12, wherein the at least one dispersive element comprises at least one first dispersive element, the optical fiber comprises a first optical fiber, and the beam redirector comprises a first beam redirector, the optoelectronic module further comprising:
- at least one second dispersive element positioned to combine the second plurality of wavelength channels from the power monitor assembly through either refraction or diffraction;
- a second beam redirector positioned to receive the combined second plurality of wavelength channels from the at least one second dispersive element and to redirect the combined second plurality of wavelength channels toward a coupler lens; and
- the coupler lens positioned to couple the redirected output from the second beam redirector into a second optical fiber.

19. The optoelectronic module of claim 12, wherein the at least one dispersive element comprises at least one first dispersive element, and wherein the single piece power monitor assembly, at least one second dispersive element, and one or more lenses or one or more mirrors that are a part of the multiplexer are collectively formed in a single molded thermoplastic component.

20. The optoelectronic module of claim 12, further comprising a phase plate formed on at least one surface of the multiplexer through which the second plurality of wavelength channels pass, wherein the phase plate is configured for selective fiber mode launch and laser isolation.

* * * * *